(12) United States Patent
Miyahara et al.

(10) Patent No.: US 7,218,351 B2
(45) Date of Patent: May 15, 2007

(54) IMAGE-SENSING APPARATUS FOR COMPENSATING VIDEO SIGNAL OF A PLURALITY OF CHANNELS

(75) Inventors: Hiroyuki Miyahara, Yokohama (JP); Hiroyasu Kunimi, Kamakura (JP); Hiroshi Nishiyama, Ninomiya-machi (JP); Tetsuya Oura, Yokohama (JP); Takeshi Ibaraki, Kawasaki (JP)

(73) Assignee: Victor Company of Japan, Limited, Yokohama (JP)

( * ) Notice: Subject to any disclaimer, the term of this patent is extended or adjusted under 35 U.S.C. 154(b) by 770 days.

(21) Appl. No.: 10/405,478

(22) Filed: Apr. 3, 2003

(65) Prior Publication Data

US 2004/0169750 A1    Sep. 2, 2004

(30) Foreign Application Priority Data

Apr. 5, 2002   (JP) .............................. 2002-103892
Apr. 12, 2002  (JP) .............................. 2002-110652

(51) Int. Cl.
*H04N 5/335*   (2006.01)
*H04N 9/64*    (2006.01)

(52) U.S. Cl. ..................... 348/313; 348/315; 348/316; 348/243; 348/249

(58) Field of Classification Search ................ 348/241, 348/313, 243, 315, 316, 248, 249, 251, 306
See application file for complete search history.

(56) References Cited

U.S. PATENT DOCUMENTS 5,105,277 A * 4/1992 Hayes et al. ................. 348/313
5,272,536 A * 12/1993 Sudo et al. .................. 348/243
5,384,596 A * 1/1995 Kobayashi et al. ......... 348/241
6,130,712 A * 10/2000 Miyazaki et al. ........... 348/243
6,304,292 B1* 10/2001 Ide et al. ..................... 348/243
6,714,241 B2* 3/2004 Baer .......................... 348/241
6,839,085 B1* 1/2005 Matsukawa ................. 348/243
6,900,837 B2* 5/2005 Muramatsu et al. ........ 348/243
2003/0107662 A1* 6/2003 Suzuki ....................... 348/249

FOREIGN PATENT DOCUMENTS

| JP | 2-78382/1990 | 3/1990 |
| JP | 5-130450/1993 | 5/1993 |
| JP | 6-78224/1994 | 3/1994 |
| JP | 06-086181 | 3/1994 |
| JP | 08-125934 | 5/1996 |
| JP | 8-223486/1996 | 8/1996 |

* cited by examiner

*Primary Examiner*—Ngoc-Yen Vu
*Assistant Examiner*—Nicholas G Giles
(74) *Attorney, Agent, or Firm*—Connolly Bove Lodge & Hutz LLP

(57) ABSTRACT

An image-sensing apparatus for compensating video signal of a plurality of channels, adds an electric charge of a pilot signal on a signal vertically transferred in an image-sensing device 11. A pixel area of the image-sensing device 11 is divided into a plurality of pixel areas to obtain an output signal of a plurality of channels. The pilot signal is add to an output signal of each pixel area corresponding to each channel for twice a field period, and for different electric potential. The control circuit 15 obtains a difference between the two pilot signals in one filed period, and controls the gain compensation 17 to make the pilot signal level in each channel equal. Additionally, the pilot signal is not used for compensation but the previous signal is used when a smear element is detected from the output signal of each channel.

4 Claims, 7 Drawing Sheets

Fig. 3 (A) VD
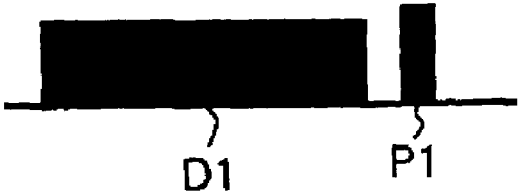
Fig. 3 (B) ch1
D1  P1
Fig. 3 (C) VD
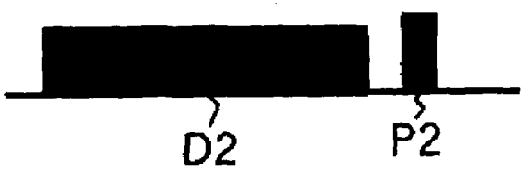
Fig. 3 (D) ch2
D2  P2
Fig. 4 (A)
Fig. 4 (B) 190mV
Fig. 4 (C) 90mV

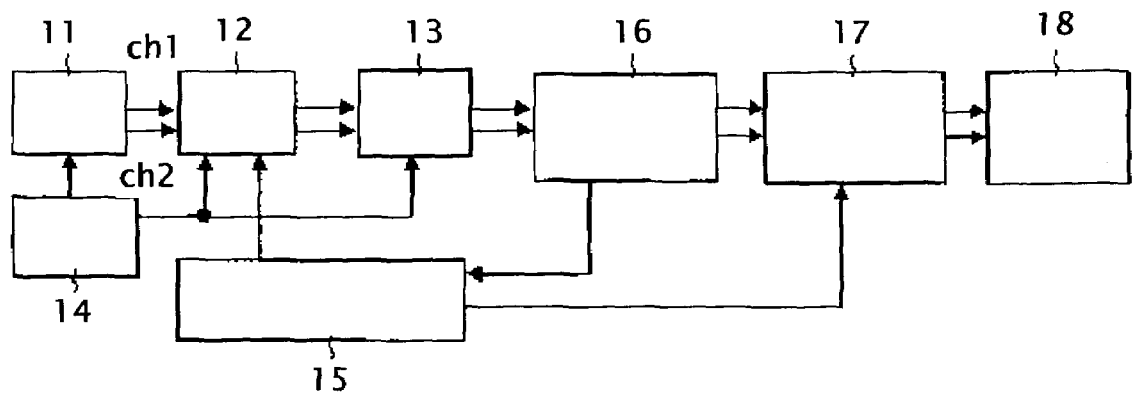
Fig. 5
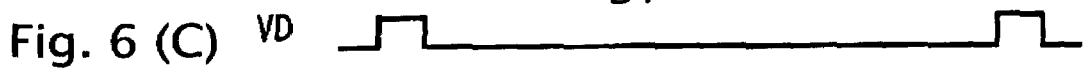

Fig. 10
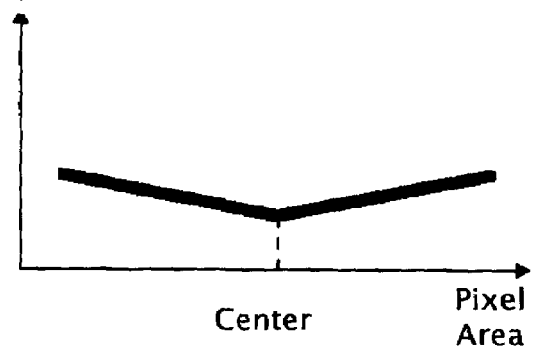 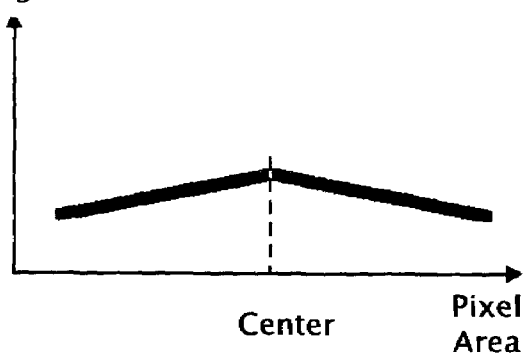
Fig. 11 (A)　　　　　　　　Fig. 11 (B)

IMAGE-SENSING APPARATUS FOR COMPENSATING VIDEO SIGNAL OF A PLURALITY OF CHANNELS

BACKGROUND OF THE INVENTION

1. Field of the Invention

The present invention relates to an image-sensing apparatus for compensating video signal of a plurality of channels, and especially relates to an image-sensing device for generating a plurality of channel outputs and for compensating an output signal level in each channel.

2. Description of the Related Art

Recently, a micro-fabrication technology has been developed remarkably for manufacturing large scale semiconductor integrated circuit (LSI). In addition, there is a need in the market for image-sensing apparatus which provides high resolution pictures. The image-sensing apparatus includes an image-sensing device which converts an optical image into a video signal, and various signal processors to conduct signal conditioning on the video signal outputted from the image-sensing device.

In order to obtain high resolution pictures, a number of pixels in the image-sensing device becomes bigger because more pixels in the same area provide higher resolution pictures. Accordingly, a number of pixels corresponding to one scanning line in the image-sensing device becomes bigger.

However, an output time of video signal for one scanning line is fixed by the television format specification. In other words, in order to obtain video signal from an image-sensing device having more pixels in one scanning line, it naturally requires a clock signal having higher frequency to read-out video signal from such the image-sensing device.

In case that a clock signal has higher frequency, various signal processing circuits in a subsequent stage need to operate in such a clock signal of higher frequency, which limits a circuitry design for image-sensing apparatus. In addition, the processing circuit operating in high frequency clock signal requires various arrangements to avoid an influence of noise or radiation, etc.

SUMMARY OF THE INVENTION

It is an object of present invention to provide an image-sensing apparatus for compensating signal level in plurality of channels precisely.

Other object of present invention is to provide an image-sensing apparatus which eliminates an influence of smear in the output signal.

Other object of present invention is to provide an image-sensing apparatus which suppresses an influence of shading occurred in the image sensing device.

Other object of present invention is to provide an image-sensing apparatus which corrects differences of an OB signal between plurality of channels.

Other object of present invention is to provide an image-sensing apparatus which improves precision of a reference compensation signal such as a pilot signal.

Other object of present invention is to provide an image-sensing device which prevents malfunction caused by smear.

Accordingly, in consideration of the above-mentioned problems of the related art, an object of the present invention is to provide an image-sensing apparatus for compensating a video signal of a plurality of channels including, an image-sensing device having a plurality of divided pixel areas to output a plurality of channels of video signal corresponding to each area and a vertical pilot signal adder provided for each of the plurality of divided pixel areas, the vertical pilot signal adder further comprising an adding means for adding an electric charge of a pilot signal to an output signal of each of the plurality of pixel areas for more than once in different electric potential; a detection means for detecting the pilot signal from the output of each channel of the image-sensing device; and a control means for controlling an output signal level of the video signal for each channel, wherein the control means controls the output signal level by calculating a difference of the pilot signals from a predetermined value for each channel, and equalizing the difference of the pilot signals in each channel.

In order to achieve the above objects, the present invention provides, according to one aspect thereof, an image-sensing apparatus for compensating video signal of a plurality of channels including, an image-sensing device having a plurality of divided pixel areas (1A, 1B, 51A, 51B) to output a plurality of channels of video signal and optical black (OB) areas provided vertically and horizontally for each of the plurality of divided pixel areas, the optical black (OB) areas obtaining a reference signal for black level of an video signal, accompanied with each of the plurality of divided pixel areas to output an OB signal together with the video signal for each channel; a control means (15, 21, 74) for controlling a signal level of a plurality of OB signals outputted in vertical direction for each channel to be a predetermined signal level; a detection means (16, 24, 76) for detecting a first signal level of the OB signal outputted in vertical direction, and a second signal level as an average signal level of the OB signal outputted in horizontal direction, and for providing a detecting result to the control means; and a compensation means (17, 22, 77) for compensating each channel of an output signal from the control means by a difference of the first signal level and the second signal level.

According to another aspect of the present invention, there provided an image-sensing apparatus for compensating video signal of a plurality of channels including, an image-sensing device having a plurality of divided pixel areas to output a plurality of channels of video signal and optical black (OB) areas provided vertically and horizontally for each of the plurality of divided pixel areas, the optical black (OB) areas obtaining a reference signal for black level of an video signal, accompanied with each of the plurality of divided pixel areas to output an OB signal together with the video signal for each channels; a control means for controlling a signal level of a plurality of OB signals outputted in horizontal direction for each channel to be a predetermined signal level; a detection means for detecting a first signal level of the OB signal outputted in vertical direction, and a second signal level of the OB signal outputted in horizontal direction, and for providing a detecting result of the second signal level to the control means; and a compensation means for compensating each channel of an output signal from the control means by a difference of the first signal level and a predetermined signal level.

Other object and further features of the present invention will be apparent from the following detailed description when read in conjunction with the accompanying drawings.

BRIEF DESCRIPTION OF DRAWINGS

FIG. 3(A) shows a vertical synchronization signal for the first channel output signal.

FIG. 3(B) shows a video signal portion and a pilot signal portion of the first channel output signal.

FIG. 3(C) shows a vertical synchronization signal for the second channel output signal.

FIG. 3(D) shows a video portion and a pilot signal portion of the second channel output signal.

FIG. 4(A) shows a horizontal synchronization pulse for the first channel output signal.

FIG. 4(B) shows the pilot signal in horizontal direction which signal is shown in FIG. 3(B).

FIG. 4(C) shows the pilot signal in horizontal direction which signal is shown in FIG. 3(D).

FIG. 5 is a block diagram of an image-sensing apparatus according to a first embodiment of the present invention.

FIG. 6(A) shows a synchronization signal.

FIG. 6(B) shows the first channel output signal.

FIG. 6(C) shows a synchronization signal.

FIG. 6(D) shows the second channel output signal.

FIG. 7(A) shows an example of a pilot signal of 2.0 V detected in the detection circuit.

FIG. 7(B) shows an example of a pilot signal of 3.0 V detected in the detection circuit.

FIG. 7(C) shows the absolute value of the difference between the former pilot signal PV1 (200 mV) and the latter pilot signal PV2 (300 mV).

FIG. 10 shows an output signal of OB area.

FIG. 11(A) shows an output signal level in relation to the pixel area of the image-sensing device shown in FIG. 9(A).

FIG. 11(B) shows an output signal level in relation to the pixel area of the image-sensing device shown in FIG. 9(B).

DETAILED DESCRIPTION OF THE PREFERRED EMBODIMENTS

An improved version of the image-sensing device described in the related art (not shown) is provided as follows.

Figure 1:
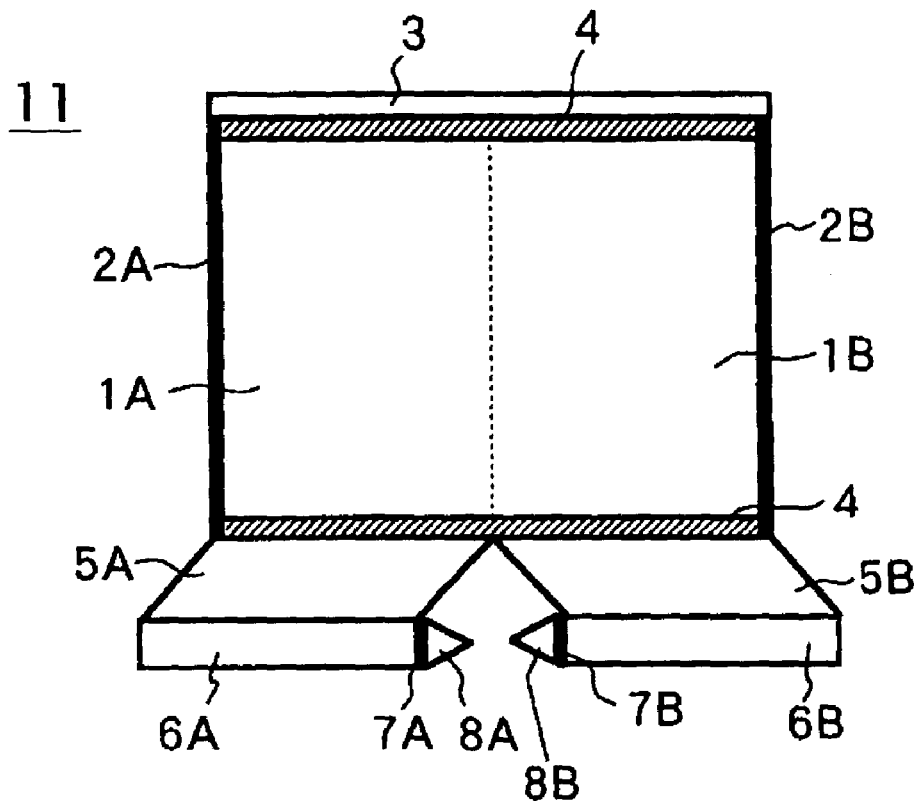
FIG. 1 is a plan view of an image-sensing device having two channel outputs.

FIG. 1 is a plan view of an image-sensing-device having two channel outputs. In FIG. 1, an image-sensing device 11 is composed of a picture area separated into two divided areas 1A and 1B, optical black (OB) areas (hereinafter referred to as "OB area") 2A and 2B placed in each side edge of the divided areas 1A and 1B, a vertical pilot adder 3 placed at the top portion of the picture area, two OB areas 4 at the top and bottom portion of the picture area, oblique shift areas 5A and 5B for shifting an electric charge from the divided areas 1A and 1B, and the OB areas 4, horizontal transferring CCDs (hereinafter referred to as "HCCDS") 6A and 6B to shift the electric charge transferred from the oblique shift areas 5A and 5B, pilot adders 7A and 7B for adding a pilot signal to an output of HCCDs 6A and 6B, and amplifiers 8A and 8B to amplify output of the pilot adders 7A and 7B respectively.

The divided area 1A and OB area 2A have plurality of pixels placed in two-dimensional matrix array of which pixels transfer an electric charge converted from an optical image towards the vertical direction by a vertical transfer CCD not shown. The vertical transfer CCD is hereinafter also referred to as "VCCD". The electric charge is transferred to the HCCD 6A through the oblique shift area 5A, and horizontally shifted towards the pilot adder 7A, and outputted from the amplifier 8A as a first channel video signal.

Similarly, the divided area 1B and the OB area 2B have a plurality of pixels placed in a two-dimensional matrix array of which pixels transfer an electric charge converted from an optical image towards the vertical direction by a vertical transfer CCD (hereinafter also referred to as "VCCD") not shown. The electric charge is transferred to the HCCD 6B through the oblique shift area 5B, and horizontally shifted towards the pilot adder 7B, and outputted from the amplifier 8B as a second channel video signal.

The OB areas 2A, 2B and 4 have a plurality of pixels, which are shut out from incoming light to obtain a reference signal having an optical black level.

As the picture area of the image-sensing device is divided into two areas, a frequency of clock signal to read-out video signal can be half of the frequency of clock signal used for the picture area not divided. This type of image-sensing device is advantageous to noise or radiation arrangements.

However, since the image-sensing device 11 has two independent output channels, each output signal may include various differences caused by variation of transferring efficiency, gain of the output of amplifiers 8A and 8B.

Figure 2:
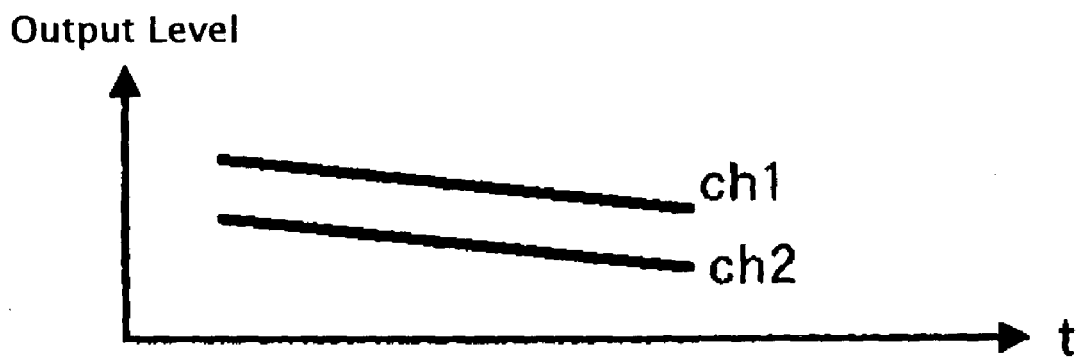
FIG. 2 shows an example of first and second channel output signals of the image-sensing device shown in FIG. 1.

FIG. 2 shows an example of first and second channel output signal of the image-sensing device shown in FIG. 1. In FIG. 2, the output level of the first channel and the second channel is different. In addition, the output signal level decays gradually. This is because the latter portion of the output signal is generated by an electric charge transferred through many transferring stages. As the electric charge passes through many transferring stages, the output level decays more by influence accumulated.

Accordingly, the pilot adder 3 shown in FIG. 1 adds a pilot signal as a reference signal having a predetermined signal level to the output signal of each of the divided areas 1A and 1B. In addition, the pilot adders 7A and 7B add a pilot signal as a reference signal having a predetermined signal level to the output signal transferred towards the horizontal direction. The reference signals are utilized for compensating level difference between the first and second channel signals.

The pilot signal is added to so called a "dummy pixel" portion in the latter portion of output video signal. An electric charge of predetermined level is added to the video signal.

FIG. 3(A) shows a synchronization signal for the first channel output signal. FIG. 3(B) shows a video signal portion D1 and a pilot signal portion P1 of the first channel output signal. FIG. 3(C) shows a synchronization signal for the second channel output signal. FIG. 3(D) shows a video signal portion D2 and a pilot signal portion P2 of the second channel output signal.

The signal level of the pilot signals P1 and P2 should be equal. In this sense, the level difference between the pilot signals P1 and P2 is detected and adjusted to fill the gap of level difference. Accordingly, the level difference between the first and second channel output signals is compensated.

A horizontal transferring pulse as a driving pulse for each of the HCCD 6A and HCCD 6B has a phase opposite to each other. The electric charge of the pixel in the divided area 1A is transferred to the horizontal direction (in the case of FIG. 1, from right to left direction) and outputted from the amplifier 8A, and the electric charge of the pixel in the divided area 1B is transferred to the horizontal direction (in the case of FIG. 1, from left to right direction) and outputted from the amplifier 8B. In this sense, the number of transferring stages for the divided areas 1A and 1B becomes the same. This prevents discontinuity of picture image caused by the difference of transferring stages for electric charge generated in the center portion of the picture area.

FIG. 4(A) shows a horizontal synchronization pulse HD for the first and second channel output signals. FIG. 4(B) shows the pilot signal P1 in horizontal direction and FIG. 4(C) shows the pilot signal P2 in horizontal direction. It is supposed that an output level of first and second channels are, for example, set to be 200 mV, and the output ratio of the pilot signal P1/P2 is "2". Then the actual output of the first channel output signal P1 is 190 mV in consideration of transferring efficiency. In this instance, the output signal of the second channel P2 should be 95 mV.

However, as shown in FIGS. 4(B) and 4(C) respectively, each output level of the first channel output signal and the second channel output signal changes irregularly by a barrier of various adder in each of transferring stages. This irregularity of signal level causes an accidental error which affects the quality of video picture.

[First Embodiment]

FIG. 5 is a block diagram of an image-sensing apparatus according to a first embodiment of the present invention.

In FIG. 5, the image-sensing apparatus is composed of an image-sensing device 11, a CDS circuit 12, an ADC circuit 13, a timing generator 14, a control circuit 15, a detection circuit 16, a gain compensation 17, and a YC processor 18.

The image-sensing device 11 has the same construction of the image-sensing device shown in FIG. 1. The vertical pilot adder 3 directly adds a pilot signal having predetermined level to the video signal generated from each of the divided areas 1A and 1B. The way of adding electric charge to the video signal is not limited but include the way described in, for example Japanese Patent Application Laid-open Publication Nos. 6(1994)-86181 and 8(1996)-125934.

The way of adding electric charge is conducted by supplying a pulse to predetermined electric pole. An irregular change of pilot signal level is caused by a potential barrier generated in a CCD substrate contiguous to a transferring electric pole, when the pilot signal is transferred through the pole. The irregular change by the potential barrier is typical for the pixels and its value is constant to the electric charge to be added.

In the case of the present invention, the vertical pilot adder 3 adds the pilot signal into the video signal from the divided areas 1A and 1B, for example, twice in one vertical blanking period. The amount of electric charge to be added in the first time and the second time is changed so that the variation caused by the potential barrier is absorbed.

It is supposed that the level of pilot signal to be added in the first time is PV1 (a former pilot signal), and in the second time is PV2 (a latter pilot signal), a pilot signal Pch is described as follows;

$$Pch = |PV1 - PV2|$$

Such the pilot signal Pch (a compensation pilot signal) compensates the potential barrier.

The timing generator 14 provides a horizontal transferring pulse, a vertical transferring pulse, and a pilot signal to the image-sensing device 11. As for the pilot signal, for example, a pilot signal of 2.0 V and 3.0 V is sequentially supplied in the same field, or serially to the vertical pilot adder 3 in the vertical blanking period.

FIG. 6(A) shows a synchronization signal and FIG. 6(B) shows the first channel output signal. FIG. 6(C) shows a synchronization signal and FIG. 6(D) shows the second channel output signal. In FIG. 6(B), the first channel output signal is obtained from the divided area 1A with the video signal and OB signal D1, and pilot signals P11 and P12. In FIG. 6(D), the second channel output signal is obtained from the divided area 1B with the video signal and OB signal D2, and pilot signals P21 and P22.

The first and second channel output signals outputted from the image-sensing device 11 are supplied to the CDS circuit 12. The CDS circuit 12 conducts OB clamp processing and correlation-double-sampling (CDS) processing on each channel signal. Then the CDS circuit 12 provides an output signal to the AD converter 13. The AD converter 13 provides each channel signal converted into digital signal form to the detection circuit 16. The detection circuit 16 detects a pilot signal level and a smear element in each channel of the digital signal supplied from the AD converter 13.

FIG. 7(A) shows an example of a pilot signal of 2.0 V detected in the detection circuit 16. FIG. 7(B) shows an example of a pilot signal of 3.0 V detected in the detection circuit 16. FIG. 7(C) shows the absolute value of the difference between the former pilot signal PV1 (200 mV) and the latter pilot signal PV2 (300 mV).

In FIG. 7(A), the detection circuit 16 detects the pilot signal P11 and P21. In this case, the output level of the former pilot signal PV1 is 200 mV. In FIG. 7(B), the detection circuit 16 detects the pilot signal P12 and P22. In this case, the output level of the latter pilot signal PV2 is 300 mV.

Accordingly, the control circuit 15 calculates the compensation pilot signal Pch as described above. In this case, the signal level of the compensation pilot signal Pch is 100 mV which is the absolute value of the difference between PV1 (200 mV) and PV2 (300 mV) as shown in FIG. 7(C).

The compensation pilot signal Pch is calculated in each channel signal. The control circuit 15 calculates the compensation pilot signal Pch for the first channel by the pilot signal P11, which is applied to PV1, and the pilot signal P12, which is applied to PV2. Similarly, the control circuit 15 calculates the compensation pilot signal Pch for the second channel by the pilot signal P21, which is applied to PV1, and the pilot signal P22, which is applied to PV2.

The control circuit 15 compensates the level of video signal, OB signal and pilot signal of the first and second channels, to be supplied to the gain compensation 17 through the detection circuit 16. The gain compensation 17 adjusts the signal level of the first and second channel signals to make signal level of the compensation pilot signal of the first channel Pch1 and the compensation pilot signal of the second channel Pch2 to be the same. Two channel output signals from the gain compensation 17 are supplied to the YC processor 18. The YC processor 18 conducts predetermined signal processing on each luminance signal element (Y) and color signal element (C) in each channel of the video signal.

The pilot signal is outputted from the image-sensing device 11 subsequent to the video signal and OB signal. As the vertical OB signal is affected by an influence of a smear (in other words, the smear element is superimposed on the OB signal), the pilot signal is also affected by the influence of the smear.

In this sense, when the smear element is superimposed on the pilot signal, the compensation of each channel signal becomes difficult. Accordingly, the detection circuit 16 detects the smear element superimposed on the pilot signal and provides detection result to the control circuit 15. For example of detection, the vertical OB signal is compared with an average value of OB signal and it is determined that the smear element is superimposed on the signal when the difference is bigger than a predetermined value.

At the time when the control circuit 15 receives the detection result that the smear element is superimposed on the OB signal, the control circuit 15 controls the gain compensation 17 to, for example, eliminate the signal portion where the smear element is superimposed on from the gain compensation operation by using the pilot signal PV, or utilize previous data for gain compensation operation. Either operation prevents an influence of smear element superimposed on the pilot signal.

As described above, the first embodiment of the present invention provides the image-sensing apparatus which can add the pilot signal twice in the vertical blanking period, and change the value of the pilot signal in the first time and the second time of adding, and adjust an output level difference of the two pilot signals so that the variation of potential barrier is prevented to make an accurate detection of the pilot signal and an accurate level compensation of each channel signal.

[Second Embodiment]

Figure 8:
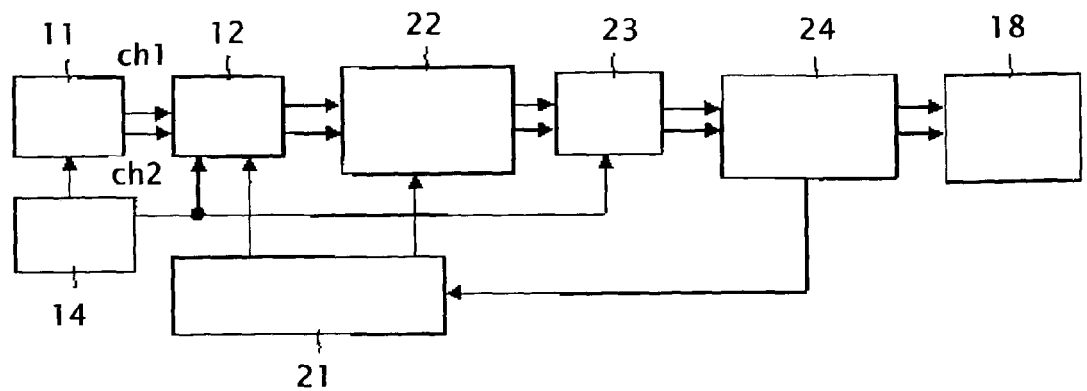
FIG. 8 is a block diagram of an image-sensing apparatus according to a second embodiment of the present invention.

FIG. 8 is a block diagram of an image-sensing apparatus according to a second embodiment of the present invention.

In FIG. 8, the image-sensing apparatus is composed of the image-sensing device 11, the CDS circuit 12, the timing generator 14 and the YC processor 18, and a gain compensation 22, an AD converter 23, a detection circuit 24, and a control circuit 21. The image-sensing apparatus according to the second embodiment of the present invention is characterized in that the gain compensation 22 conducts a gain compensating operation.

The image-sensing device 11 outputs two channel output signals to the CDS circuit 12. The CDS circuit 12 conducts OB clamp processing and correlation-double-sampling (CDS) processing on each channel signal. Then the CDS circuit 12 provides output signals to the gain compensation 22.

The gain compensation 22 conducts level compensation on the output signals supplied from the CDS circuit 12 by a control signal provided from the control circuit 21. Each channel output signal is then provided to the AD converter 23 from the gain compensation 22, and converted into a digital signal form.

Two channels of video signals, OB signals and pilot signals in digital form are provided to the detection circuit 24. The detection circuit 24 detects the level of pilot signal and the smear element superimposed thereon, and the detection result is supplied to the control circuit 21. The two channel video signals, OB signals and pilot signals in digital form are then provided to the YC processor 18. At the time when the control circuit 21 receives the detection result that the smear element is superimposed on the OB signal, it controls the gain compensation 22 to, for example, and as described in the first embodiment above, eliminate the signal portion where the smear element is superimposed on from the gain compensation operation using the pilot signal PV, or utilize previous data for gain compensation operation. Either operation prevents an influence of smear element superimposed on the pilot signal.

Although the invention has been described in its preferred embodiments with a certain degree of particularity, it is understood that the present invention is not limited to the above embodiments. For example, the pilot signal can be added to each channel output signal for more than twice in the same field, or for several scanning lines, and then an average of electric potential of an electric charge to be added by pixel can be calculated to reduce an influence of random noise.

The pilot adders 7A and 7B shown in FIG. 1 may directly add an electric charge of predetermined level for a predetermined period in the video signal to be transferred to the horizontal direction. In this case, a horizontal pilot signal is added after horizontal transfer by the HCCDs 6A and 6B and vertical transfer by VCCD are completed. In this sense, it is difficult to simply compare the transferring efficiency, but it is possible to detect gain difference between the output signals from the image-sensing device 11 (i.e. an output of the amplifiers 8A and 8B) through the gain compensation 17 and 22.

Accordingly, the gain detection is conducted by the pilot signal in the horizontal direction, and the comparison of transferring efficiency is conducted by the pilot signal in the vertical direction. The pilot signal in the horizontal direction is used for adjusting the two channel output signals to be the same level. By utilizing the pilot signal in the horizontal and vertical directions, the detection of signal level for each channel output signal is conducted more accurately.

The image-sensing device 11 shown in FIG. 8 is the same device shown in FIG. 5. However, it should be noted that the pixel area of the image-sensing device 11 can be divided in more than three portions. In addition, the pilot signal can be added for more than three times, and not only for a field period but also for a frame period, or even for a predetermined period.

As to an image-sensing device of which pixel area is divided into two pixel areas, a video signal is obtained by reading out a signal from each divided pixel area as an independent channel output. In this sense, a clock signal frequency of a driving pulse or read-out pulse for such the divided pixel area can be half of the clock signal frequency for the whole pixel area not divided.

Figure 9:
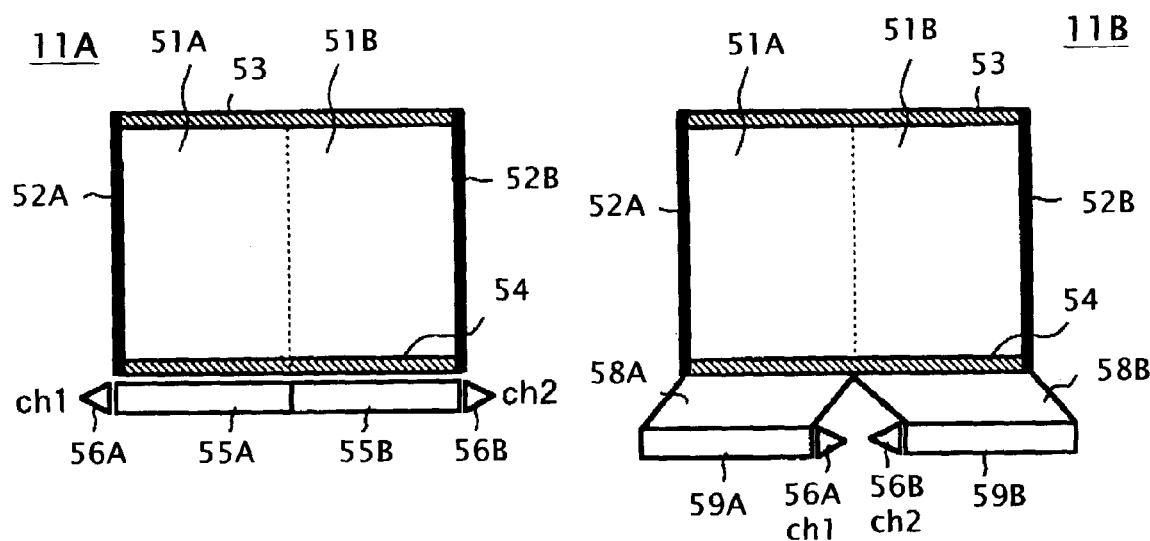
FIG. 9(A) shows an example of an image-sensing device of which pixel area is divided.
FIG. 9(B) shows another example of an image-sensing device of which pixel area is divided.

FIG. 9(A) shows an example of an image-sensing device of which pixel area is divided, and FIG. 9(B) shows another example of an image-sensing device of which pixel area is divided.

In FIG. 9(A), an image-sensing device 11A is composed of divided pixel areas 51A and 51B, optical black (OB) areas 52A and 52B placed at the vertical direction of each edge of the divided pixel areas 51A and 51B, OB areas 53 and 54 placed at the top and bottom portion of the divided pixel areas 51A and 51B, and horizontal transferring CCDs (hereinafter referred to as HCCDS) 55A and 55B for transferring electric charges transferred from each of the divided pixel areas 51A and 51B, and from the OB areas 52A and 52B, and output amplifiers 56A and 56B connected to each of the HCCDS 55A and 55B.

The divided pixel areas 51A and 51B include a plurality of pixels positioned in two-dimensional array of which pixel includes vertical transferring CCDs for transferring an electric charge converted from an optical image towards the vertical direction of the divided pixel areas. The electric charge generated in each of the divided pixel areas 51A and 51B is transferred to the HCCDs 55A and 55B. The HCCDs 55A and 55B transfer the electric charge towards the horizontal direction and amplified by the amplifiers 56A and 56B to output first and second channel output signals respectively.

In FIG. 9(B), an image-sensing device is composed of all elements indicated in FIG. 9(A), except that the OB area 54 is connected with oblique shift areas 58A and 58B, and oblique shift areas 58A and 58B is connected with HCCDs 59A and 59B respectively, and each of the HCCDs 59A and 59B is connected with the amplifiers 56A and 56B.

In FIG. 9(A), the electric charge to be transferred to the HCCDs 55A and 55B is horizontally transferred from each of the left and right sides of the divided pixel areas towards the center of the pixel area, and outputted from the amplifiers 56A and 56B.

In FIG. 9(B), the electric charge to be transferred to the HCCDs 59A and 59B is horizontally transferred from the center of pixel areas towards each of the left and right sides of the pixel areas, and outputted from the amplifiers 56A and 56B through the oblique shift areas 58A and 58B and the HCCDs 59A and 59B.

The OB areas 52A, 52B, 53 and 54 are composed of a plurality of pixels in each line, but they are light-shielded to obtain a reference signal of optical black level.

FIG. 10 shows an output signal of an OB area. The transferring efficiency of the HCCDs 55A, 55B, 59A and 59B is not perfect that the output level of the OB signals from the OB areas 53 and 54 declines as the electric charge passes through more transferring stages.

In this sense, the transferring efficiency of the electric charge is more effective if the electric charge is transferred through less transferring stages.

FIG. 11(A) shows an output signal level in relation to the pixel area of the image-sensing device 11A shown in FIG. 9(A). FIG. 11(B) shows an output signal level in relation to the pixel area of the image-sensing device 11B shown in FIG. 9(B).

The image-sensing device 11A transfers the electric charge from each of the left and right sides towards the center of the pixel area. The image-sensing device 11B transfers the electric charge from the center to each of the left and right sides of the pixel area.

In contrast, the OB areas 52A and 52B have less transferring stages that the transferring efficiency is high. The transferring efficiency is more effective for the pixels in lower portion of the pixel area in either image-sensing device 11A or 11B.

Figure 12:
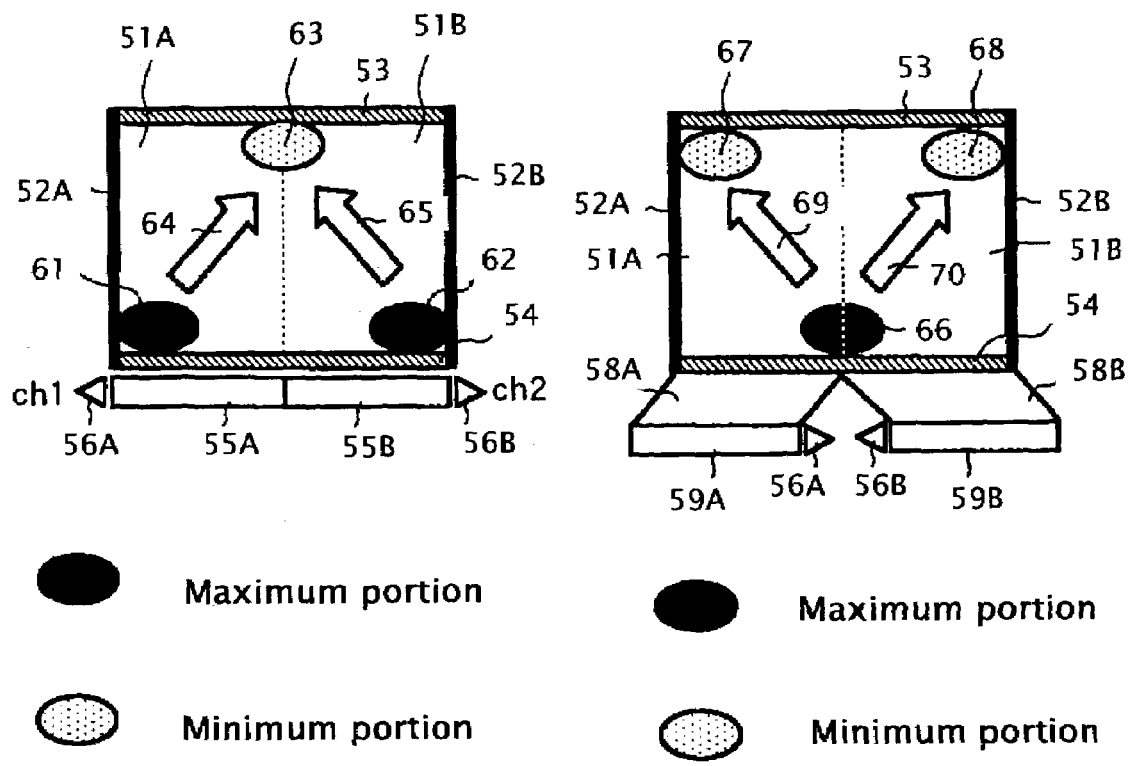
FIG. 12(A) is a diagram for explaining the transferring efficiency of the image-sensing device shown in FIG. 9(A).
FIG. 12(B) is a diagram for explaining the transferring efficiency of the image-sensing device shown in FIG. 9(B).

FIG. 12(A) is a diagram for explaining the transferring efficiency of the image-sensing device shown in FIG. 9(A). FIG. 12(B) is a diagram for explaining the transferring efficiency of the image-sensing device shown in FIG. 9(B).

In FIG. 12(A), the image-sensing device has pixel portions 61 and 62 where an output signal level is maximum (Maximum portion) and pixel portion 63 where an output signal level is minimum (Minimum portion), by the transferring efficiency of the electric charge generated in the pixel area. In this sense, there occurs a slope of output signal level (so called "shading") towards the direction shown as arrows 64 and 65.

In FIG. 12(B), the image-sensing device has pixel portion 66 where an output signal level is maximum and pixel portions 67 and 68 where an output signal level is minimum. In this sense, there occurs a "shading" towards the direction shown as arrows 69 and 70.

Each channel output signal with the shading is compensated by adding or multiplying a certain coefficient to the output signal for compensation. However, a value of coefficient is fixed that it is not effective to compensate the shading as occurred in FIGS. 12(A) and 12(B). In addition, the OB signal is utilized for the reference signal to adjust signal differences between each channel output signal. However, the OB signal may be influenced by the shading that it can not compensate the level of each channel output signal properly.

[Third Embodiment]

Figure 13:
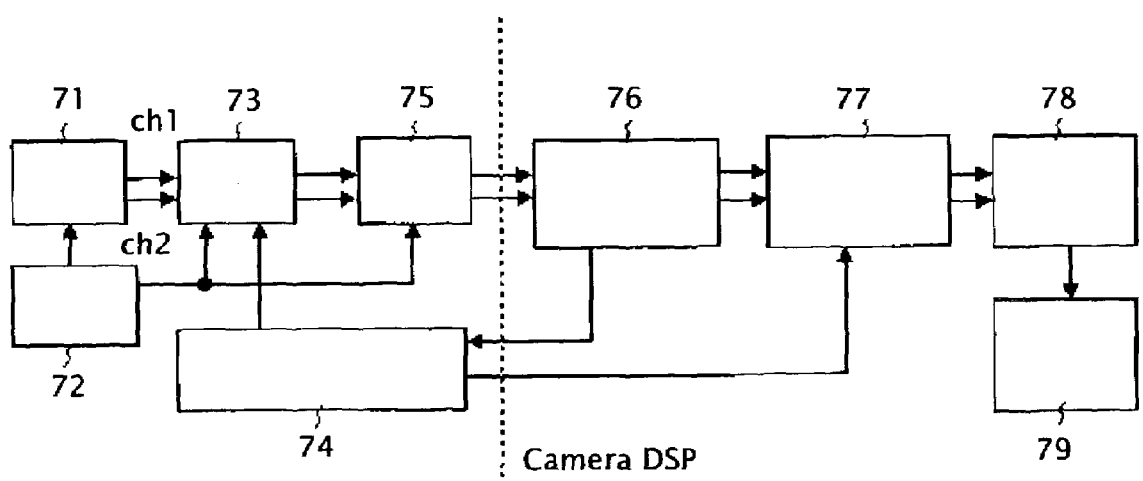
FIG. 13 is a block diagram of an image-sensing apparatus according to a third embodiment of the present invention.

FIG. 13 is a block diagram of an image-sensing apparatus according to a third embodiment of the present invention.

In FIG. 13, an image-sensing apparatus is composed of an image-sensing device 71, a timing generator 72, a CDS circuit 73, a control circuit 74, an AD converter 75, a detection circuit 76, a shading compensation circuit 77, a channel signal processor 78 and a YC processor 79.

Figure 14:
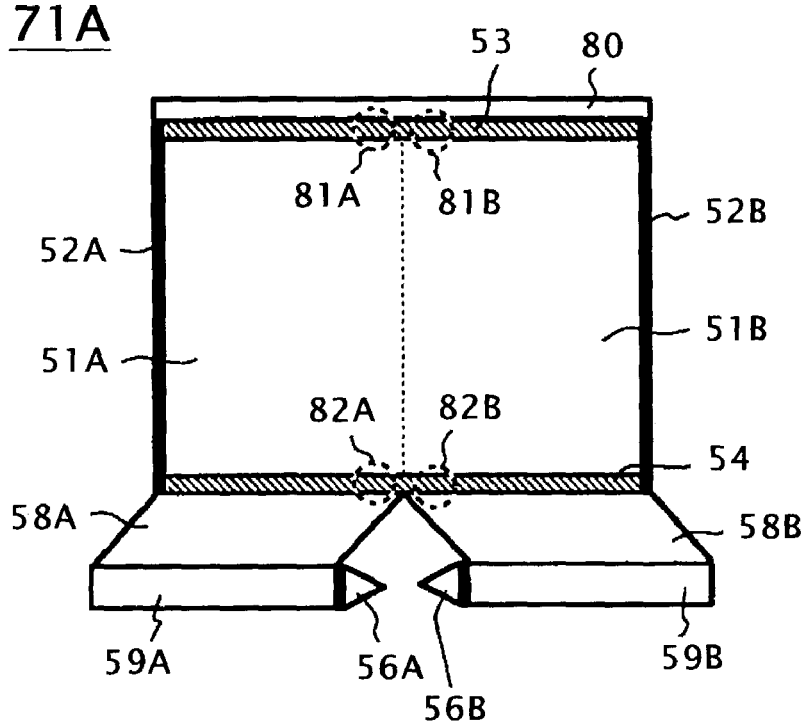
FIG. 14 is a plan view of the image-sensing device according to the third embodiment of the present invention.

FIG. 14 is a plan view of the image-sensing device 71A. Most elements of the image-sensing device 71A are the same as the image-sensing device 11B, except that the image-sensing device 71A has a pilot signal adder 80 on the top of the OB area 53.

In the case of the image-sensing device 71A which has almost the same construction of the image-sensing device 11B, the output of OB signal is affected by a transferring efficiency of the HCCDS 59A, 59B and vertical CCDS not shown.

On the other hand, the image-sensing apparatus utilizes an OB signal as a reference signal for conducting various signal processing. If the reference signal level is affected, the output signal level of the image-sensing device is also affected, and a linearity of the output signal is also affected. Accordingly, the third embodiment of the present invention provides an improved version of the image-sensing apparatus described above.

In FIG. 13, the timing generator 72 provides a horizontal transferring pulse and a vertical transferring pulse and a pilot signal to the image-sensing device 71A. As to the pilot signal, the pilot signal adder 80 provides the pilot signal pulse once in one field period.

The output signals from the amplifiers 56A and 56B of the image-sensing device 71A are supplied to the CDS circuit 73 as the first and second channel output signals respectively. The first and second channel output signals include a video signal, an OB signal and a pilot signal. The CDS circuit 73 conducts OB3 clamp processing and CDS processing on the OB signal by a clamp pulse provided from the timing generator 72. The CDS circuit 73 outputs each channel output signal to the AD converter 75 and the first and second channel output signals are converted into digital signal form by the clock pulse from the timing generator 72.

The output signals of the AD converter 75 are provided to the detection circuit 76. The detection circuit 76 detects an OB level and a smear element superimposed on the output signals. The OB signal generated in the OB areas 52A and 52B is added to the output signal of the image-sensing device 71a. The average of OB signals from a plurality of pixels is utilized as an optical black level of the video signal, and is subtracted from the video signal by conventional clamp processing. The above signal processing is conducted to each of the first and second channel output signals respectively. The electric potential of electric charge generated from each pixel may have different values by a random noise. In this case, the average of the electric potential in the horizontal direction is obtained to reduce the influence of such the random noise.

With regard to an OB signal level detected in the detection circuit 76, the OB signal level detected at portions 81A and 81B, and portions 82A and 82B, and the OB areas 52A and 52B shown in FIG. 14 are supplied to the control circuit 74.

The control circuit 74 controls the CDS circuit 73 to make the OB signal level in each of the portions 81A, 81B, 82A and 82B to be the same (for example 40h) between the first channel output signal and the second channel output signal. For example, the output signal of the AD converter 75 is 60 bits with maximum level 3FFh . Further, the control circuit 74 calculates an average (for example, 36h ) of OB signal level in the OB areas 52A and 52B when the OB signal level in the center portion of the pixel area is controlled to be 40h.

The control circuit 74 then calculates a compensation value to be supplied to the shading compensating circuit 77. The compensation value is calculated by difference between the OB signal level in the center portion of the pixel area, and the average of the OB signal level in the OB areas 52A and 52B. The shading compensating circuit 77 adds or subtracts the compensation value to the video signal, the OB signal and the pilot signal supplied from the detection circuit 76 for each channel and for predetermined horizontal pixels of the input signal. This signal processing makes the signal level shown in FIG. 11(B) into flat characteristic.

As for shading compensation, the output level of each pixel can be adjusted to obtain an average value of the divided pixel areas 51A and 51B by controlling the amount of optical light irradiated on the pixels of the image-sensing device. For example, closing an aperture lens and defocusing a camera.

The OB signal transferred towards the vertical direction is influenced by a smear element. In other words the smear element is superimposed on the OB signal. For this reason, the OB signal level can not be controlled precisely when the smear is superimposed on. The detection circuit 76, accordingly, detects the smear element and provides a detection signal to the control circuit 74. For example of detection of the smear, the OB signal level is compared with an average value of OB signal, and when the comparison result is greater than the average value, the OB signal is determined to have a smear element in the corresponding pixel.

The control circuit 74 stops the operation of the shading compensating circuit 77 when it receives the detection signal representing that the smear occurs. Simultaneously, the control circuit 74 controls the shading compensating circuit 77 to utilize the compensation value calculated by the OB signal level just before the detection of the smear element. Alternatively, the control circuit 74 may just calculate the compensation value from the OB signal level and exclude the data of OB signal level when the smear is detected. Accordingly, the shading compensation circuit 77 can operate without the influence of smear element superimposed on the OB signal.

The shading compensation circuit 77 provides two channel output signals to the channel signal processor 78. The channel signal processor detects a pilot signal of the vertical direction in each channel, and adjust the gain and linearity of each channel signal to make each pilot signal level to be the same. The two channel signals are then provided to the YC processor 79. The YC processor 79 conducts conventional signal processing on a luminance signal (Y) element and a color signal (C) element in the video signal.

As described above, the image-sensing apparatus according to the third embodiment of the present invention extracts an OB signal from the portions 81A, 81B, 82A and 82B in the OB areas 53 and 54, and conducts clamp processing on the video signal in analog signal form in the CDS circuit 73, and conducts clamp processing on the video signal in digital signal form in the detection circuit 76 so that the occurrence of "shading" can precisely and accurately be eliminated or reduced by the shading compensation circuit 77. Further, the image-sensing apparatus according to the third embodiment of the present invention can adjust the difference of OB signal level between each channel by setting the same OB signal level. Further more, the image-sensing apparatus according to the third embodiment of the present invention improves the compensation of reference signals such as the pilot signal by adjusting the OB signal level to become the same in the horizontal direction.

[Fourth Embodiment]

Figure 15:
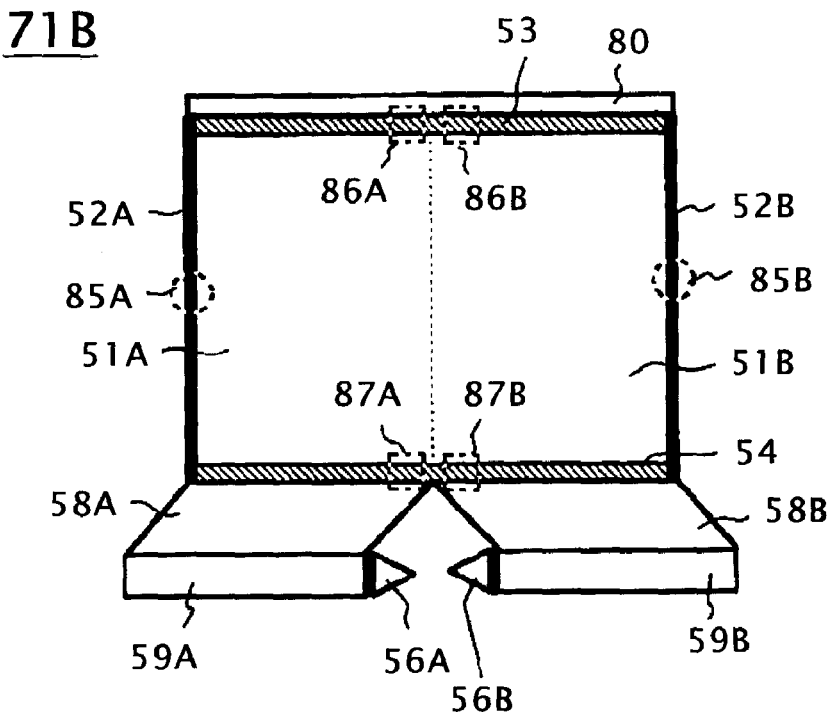
FIG. 15 is a plan view of an image-sensing device for an image-sensing apparatus according to a fourth embodiment of the present invention.

FIG. 15 shows a plan view of an image-sensing device utilized for an image-sensing apparatus according to a fourth embodiment of the present invention. The image-sensing device 71B shown in FIG. 15 has the same structure as the structure shown in FIG. 14. In FIG. 15, an OB signal level detected in areas 85A and 85B is provided to the control circuit 74. The structure of the image-sensing apparatus according to the fourth embodiment has the same structure shown in FIG. 13.

The control circuit 74 controls the CDS circuit 73 to make the OB signal level to, for example, 40 h obtained from the areas 85A and 85B. Then the control circuit 74 measures the OB signal level in areas 86A, 86B, 87A and 87B shown in FIG. 15 by the detection circuit 76. For example, the measured value is 42 h.

Subsequently, the control circuit 74 controls the shading compensating circuit 77. The shading compensating circuit 77 is provided with the video signal, OB signal and pilot signal outputted from the detection circuit 76, and calculates difference of the OB signal value. In this case, the reference value of OB signal level is 40 h but the measured value is 42 h so that the difference is 2 h. The shading compensating circuit 77 then adds or subtracts the difference value to or from the OB signal level. Accordingly, the output characteristic of the image-sensing device 71B, like shown in FIG. 11(B), becomes flat.

The shading compensation circuit 77 then provides two channel output signals to the channel signal processor 78. The channel signal processor detects pilot signal of vertical direction in each channel, and adjust the gain and linearity of each channel signals to make each pilot signal level to be the same. The two channel signals are then provided to the YC processor 79. The YC processor conducts conventional signal processing on the luminance signal (Y) element and the color signal (C) element in the video signal.

As described above, the fourth embodiment of the present invention conducts the clamp processing on the video signal in analog signal form in the CDS circuit 73, and in digital signal form in the detection circuit 76 by extracting an OB signal in the horizontal direction. The fourth embodiment does not use the OB signal in the vertical direction but it provides the same result as described in the first embodiment.

The image-sensing devices 71A and 71B are explained to have the same structure shown in FIG. 9(B) but they may have a structure shown in FIG. 9(A) as well. Further, the image-sensing devices 71A and 71B may have its pixel area divided in three or more pixel areas. It is to be understood that the invention is not limited in its application to the details of construction and arrangement of parts illustrated in the accompanying drawings, since the invention is capable of other embodiments and of being practiced or carried out in various ways.

As described above, the present invention provides an image-sensing apparatus which can improve an accuracy of compensation of signal level between different channels by detecting the pilot signal without influence or variation caused by the electric potential barrier.

The present invention provides an image-sensing apparatus which can add the pilot signal having a different electric potential, to vertically transferred electric charge for more than once so that the pilot signal can be added time-serially in field period. In this sense, the pilot signal can be added in only few horizontal periods that a vertical transferring frequency is not necessarily to be set in high frequency.

The present invention provides an image-sensing apparatus which detects the pilot signal level in the horizontal direction for each channel, and controls each channel signal level to make each of the pilot signal levels equal so that the variation of signal levels in each channel can be compensated.

The present invention provides an image-sensing apparatus which controls an output signal level of each channel to make the pilot signal level equal so that the variation of output signal levels from each channel can be compensated. Additionally, the image-sensing apparatus detects the gain difference by a horizontal pilot signal, and compares the transferring efficiency between each channel by the vertical pilot signal so that the compensation of signal level can be conducted more precisely and accurately.

The present invention provides an image-sensing apparatus which excludes the pilot signal affected by a smear for level compensation so that the influence of the smear to the level compensation can be eliminated.

The present invention provides an image-sensing apparatus which eliminates or reduces shading in the OB signal by making the output signal to have a flat characteristic.

The present invention provides an image-sensing apparatus which accurately detects reference signals such as the OB signal or pilot signal in each channel so that it can compensates each channel output signals by adjusting the pilot signal to become the same level.

The present invention provides an image-sensing apparatus which excludes the operation of compensation using the OB signal when a smear is occurred, and adopts compensation using the OB signal before the detection of the smear so that the influence of the smear can be prevented.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

What is claimed is:

1. An image-sensing apparatus for compensating a video signal of a plurality of channels comprising:
   an image-sensing device having a plurality of divided pixel areas to output a plurality of channels of video signal corresponding to each area and a vertical pilot signal adder provided for each of the plurality of divided pixel areas, the vertical pilot signal adder further comprising an adding means for adding an electric charge of a pilot signal to an output signal of each of the plurality of pixel areas for more than once at different electric potentials;
   a detection means for detecting the pilot signal from the output of each channel of the image-sensing device; and
   a control means for controlling an output signal level of the video signal for each channel,
   wherein the control means controls the output signal level by calculating a difference of the pilot signals from a predetermined value for each channel, and equalizing the difference of the pilot signals in each channel.

2. The image-sensing apparatus as claimed in claim 1, wherein the vertical pilot signal adder is provided for each channel of the output signals to supply an electric charge of the pilot signal, and wherein the detection means detects the signal level of the pilot signal for each channel, and wherein the control means controls the signal level of each channel to equalize the signal level of the pilot signal in each channel.

3. The image-sensing apparatus as claimed in claim 1, further comprising a smear detection means for detecting a smear element occurred in an output signal of each channel, wherein the control means excludes one pilot signal in an area where the smear element is detected and calculates a difference of the other pilot signals.

4. An image-sensing apparatus for compensating video signal of a plurality of channels comprising:
   an image-sensing device having a plurality of divided pixel areas to output a plurality of channels of video signal and optical black (OB) areas provided vertically and horizontally for each of the plurality of divided pixel areas, the optical black (OB) areas obtaining a reference signal for black level of a video signal, accompanied with each of the plurality of divided pixel areas to output an OB signal together with the video signal for each channels;
   a control means for controlling a signal level of a plurality of OB signals outputted in horizontal direction for each channel to be a predetermined signal level;
   a detection means for detecting a first signal level of the OB signal outputted in vertical direction, and a second signal level of the OB signal outputted in horizontal direction, and for providing a detecting result of the second signal level to the control means; and
   a compensation means for compensating each channel of an output signal from the control means by a difference of the first signal level and the predetermined signal level.

* * * * *